(12) United States Patent
Araki et al.

(10) Patent No.: US 10,093,103 B2
(45) Date of Patent: Oct. 9, 2018

(54) LIQUID DISCHARGE APPARATUS, IMPRINT APPARATUS, AND ARTICLE MANUFACTURING METHOD

(71) Applicant: CANON KABUSHIKI KAISHA, Tokyo (JP)

(72) Inventors: Yoshimasa Araki, Utsunomiya (JP); Koichi Kitakami, Tokyo (JP); Tsuyoshi Arai, Utsunomiya (JP); Yutaka Mita, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 416 days.

(21) Appl. No.: 14/794,386

(22) Filed: Jul. 8, 2015

(65) Prior Publication Data

US 2016/0009007 A1    Jan. 14, 2016

(30) Foreign Application Priority Data

Jul. 11, 2014    (JP) .................................. 2014-143659

(51) Int. Cl.
B41J 2/175    (2006.01)
B29C 64/112    (2017.01)
(Continued)

(52) U.S. Cl.
CPC ......... B41J 2/17513 (2013.01); B29C 64/112 (2017.08); B29C 64/20 (2017.08);
(Continued)

(58) Field of Classification Search
CPC .... B41J 2/17513; B41J 2/17566; B41J 2/175; B41J 2002/17576; B29C 67/0085; B29C 67/0059; B33Y 40/00; B33Y 30/00
See application file for complete search history.

(56) References Cited

U.S. PATENT DOCUMENTS 4,343,184 A * 8/1982 Jaulmes ................ G01F 23/164
73/299
5,731,824 A * 3/1998 Kneezel ............... B41J 2/17513
347/7
(Continued)

FOREIGN PATENT DOCUMENTS

JP    2000190520 A    7/2000
JP    2008105360 A    5/2008
(Continued)

OTHER PUBLICATIONS

Malloy, et al., "Technology Review and Assessment of Nanoimprint Lithography for Semiconductor and Patterned Media Manufacturing", Journal of Micro/Nanolithography, MEMS and MOEMS, 10 (3), 032001 (Jul.-Sep. 2011).*
(Continued)

Primary Examiner — Michael N Orlando
Assistant Examiner — Cynthia L Schaller
(74) Attorney, Agent, or Firm — Rossi, Kimms & McDowell LLP

(57) ABSTRACT

A liquid discharge apparatus includes: a container divided into a first chamber and a second chamber by a dividing member, the first chamber including a discharge outlet that discharges a liquid and configured to contain the liquid, the second chamber configured to contain a fluid; a tank configured to store the fluid; a connecting portion that provides fluid communication between the tank and the second chamber; a measurement unit configured to measure an amount of the fluid supplied from the tank to the second chamber; and a controller configured to obtain an amount of the liquid contained in the first chamber based on a measurement result from the measurement unit.

16 Claims, 4 Drawing Sheets

(51) Int. Cl.
*B29C 64/20* (2017.01)
*B33Y 30/00* (2015.01)
*B33Y 40/00* (2015.01)

(52) U.S. Cl.
CPC ............ *B41J 2/175* (2013.01); *B41J 2/17566* (2013.01); *B33Y 30/00* (2014.12); *B33Y 40/00* (2014.12); *B41J 2002/17576* (2013.01)

(56) References Cited

U.S. PATENT DOCUMENTS

| | | | |
|---|---|---|---|
| 6,290,343 B1 * | 9/2001 | Lewis | B41J 2/175 347/85 |
| 6,367,919 B1 * | 4/2002 | Taylor | B41J 2/17503 347/7 |
| 6,422,674 B1 | 7/2002 | Hinami et al. | |
| 6,698,869 B2 * | 3/2004 | Vosahlo | B41J 2/175 347/7 |
| 2007/0263020 A1 * | 11/2007 | Bradford | B41J 2/175 347/7 |
| 2009/0027435 A1 * | 1/2009 | Katada | B41J 2/17556 347/14 |

FOREIGN PATENT DOCUMENTS

| | | |
|---|---|---|
| JP | 2008200903 A | 9/2008 |
| JP | 2009028963 A | 2/2009 |
| KR | 1020140015406 A | 2/2014 |

OTHER PUBLICATIONS

Thomas, "Manometer Basics", Sensors Magazine, Oct. 1, 2001.*
Office Action issued in Korean Appln. No. 10-2015-0095022 dated Jan. 5, 2018.

* cited by examiner

LIQUID DISCHARGE APPARATUS, IMPRINT APPARATUS, AND ARTICLE MANUFACTURING METHOD

BACKGROUND OF THE INVENTION

Field of the Invention

The present invention relates to a liquid discharge apparatus, an imprint apparatus, and an article manufacturing method.

Description of the Related Art

As one of printing methods, an ink jet system for discharging droplets from a recording head has been developed, and such an ink jet system has recently been used in various fields. There are some cases of providing liquid discharge apparatuses with liquid tanks that regain liquid to be discharged from recording heads. Particularly in liquid discharge apparatuses for industrial uses, there is a desire to measure a remaining amount in liquid tanks, and notify users of replacement time of the liquid tanks, thereby allowing the users to replace the liquid tanks, thus reducing downtime of the apparatuses, resulting in enhancement of productivity of the apparatuses.

Japanese Patent Laid-Open No. 2000-190520 discloses a configuration of radiating light from a light-emitting unit into a flexible liquid tank so as to optically measure displacement of a position of a liquid level that is an interface between gas and liquid in the liquid tank based on change in light income on a light receiving unit. Japanese Patent Laid-Open No. 2008-105360 discloses a configuration of generating buoyancy by filling a floating bag with a filler whose density is smaller than that of a liquid filled in a container, thereby urging a flexible member in a direction to increase a volume of an ink chamber so as to apply a negative pressure to an ink.

The liquid discharge apparatus disclosed in Japanese Patent Laid-Open No. 2008-105360 generates buoyancy by filling the floating bag with the filler whose density is smaller than the density of the liquid filled in the container. Unfortunately, there is no description regarding how to measure a remaining amount of the liquid in the container in Japanese Patent Laid-Open No. 2008-105360. Meanwhile, the liquid discharge apparatus disclosed in Japanese Patent Laid-Open No. 2000-190520 optically measures displacement of the liquid level in the flexible liquid tank where there exists an interface between gas and liquid. However, in a liquid discharge apparatus in which a flexible film is provided in a container to separate the container, and a liquid filler is introduced into one of the separated containers, and a liquid is introduced into the other separated container, there exists no interface between gas and liquid; therefore, it is impossible to optically measure a position of the liquid level. This means that the method of measuring the position of the liquid level as disclosed in Japanese Patent Laid-Open 2000-190520 is inapplicable to such a liquid discharge apparatus.

SUMMARY OF THE INVENTION

The present invention provides a liquid discharge apparatus advantageous in measurement of a remaining amount of liquid.

The present invention provides a liquid discharge apparatus comprising: a container divided into a first chamber and a second chamber by a dividing member, the first chamber including a discharge outlet that discharges a liquid and configured to contain the liquid, the second chamber configured to contain a fluid; a tank configured to store the fluid; a connecting portion that provides fluid communication between the tank and the second chamber; a measurement unit configured to measure an amount of the fluid supplied from the tank to the second chamber; and a controller configured to obtain an amount of the liquid contained in the first chamber based on a measurement result from the measurement unit.

Further features of the present invention will become apparent from the following description of exemplary embodiments with reference to the attached drawings.

DESCRIPTION OF THE EMBODIMENTS

Embodiments of the present invention will be described with reference to drawings, hereinafter.

[First Embodiment]

Figure 1:
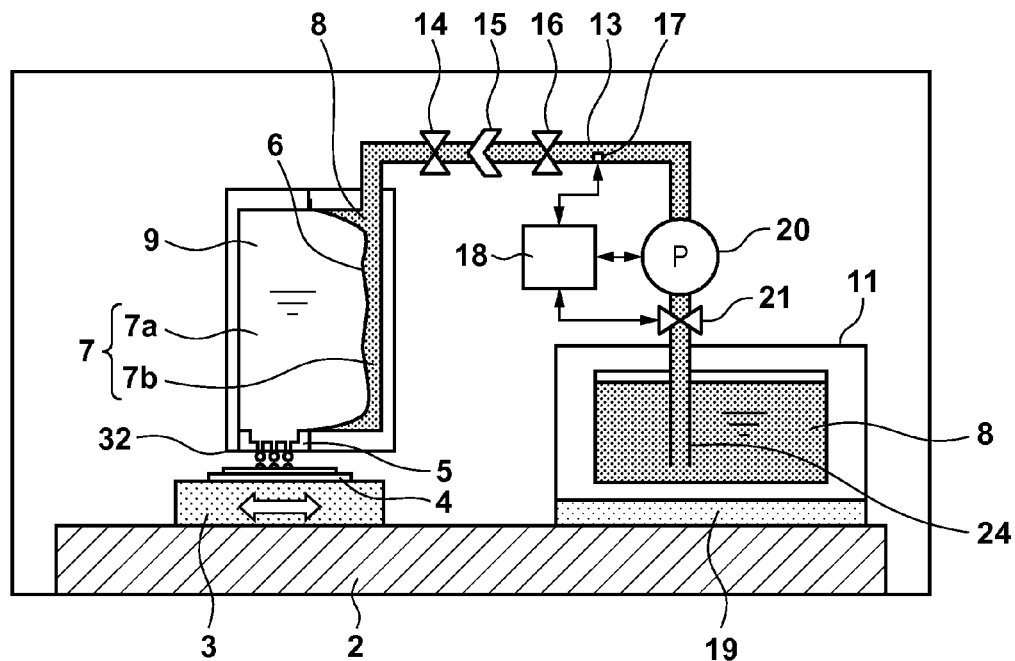
FIG. 1 is a schematic diagram of a liquid discharge apparatus according to a first embodiment.

The first embodiment of the present invention will be described with reference to FIG. 1 and FIG. 2. FIG. 1 is a schematic diagram of a liquid discharge apparatus of the first embodiment. The liquid discharge apparatus includes a container 7 that contains a liquid 9, a head 5, a tank 11 that stores a liquid filler, a pipe (connecting portion) 13 that provides fluid communication between the container 7 and the tank 11. On a base plate 2, there is provided a conveying unit 3 that conveys an object 4 to which the liquid 9 is discharged by the liquid discharge apparatus. The object 4 may be retained through suction by the conveying unit 3, for example. The container 7 that contains the liquid 9 is nonflexible, and an inside of the container 7 is divided into a first chamber 7a and a second chamber 7b. In the present embodiment, the first chamber 7a and the second chamber 7b are arranged in a manner as to be adjacent to each other in the horizontal direction, and may also be arranged in a manner as to be adjacent to each other in the vertical direction. The liquid 9 is contained in the first chamber 7a, and the liquid filler 8 is contained in the second chamber 7b. In the present embodiment, the liquid filler 8 is contained in the second chamber 7b, but other fluids than the liquid filler 8, such as gas and gel, may be contained in the second chamber 7b.

The second chamber 7b containing the liquid filler 8 is connected to the pipe 13. The liquid 9 is communicated with a nozzle (discharge outlet) 32 disposed in the head 5 so that the liquid 9 is discharged from the nozzle 32. The container 7 and the head 5 have no tube or the like therebetween, but are directly connected to each other with no slide member such as a valve. Hence, fine foreign matters can be prevented from being mixed in the liquid 9.

The pipe 13 is provided with valves 14, 16, and a joint 15 so that the container 7 is detachable from a body of the liquid discharge apparatus. When attaching or detaching the container 7, the valves 14, 16 are closed to prevent the liquid from leaking from the pipe 13 and the nozzle 32. The tank 11 is disposed on a weight scale (measurement unit) 19 that measures weight of the liquid filler 8 on the base plate 2. In the case of the present embodiment, in an initial state, a volume of the liquid 9 is set to be approximately 300 ml, a volume of the liquid filler 8 is set to be approximately 100 ml, and a volume of the container 7 is set to be approximately 400 ml. However, each volume is not limited to the above, and may be appropriately designed.

A member used for the film 6 has a thickness of approximately 10 μm to 200 μm. For example, a material used for the film 6 may be exemplified by a laminated film made of aluminum having a high tightness. The second chamber 7b is connected to the tank 11 via the pipe 13. The pipe 13 is provided with a manometer 17, a pump 20, and a valve 21. A controller 18 is connected to the manometer 17, the pump 20, and the valve 21. The manometer 17 measures a relative pressure of the liquid filler 8 relative to an atmospheric pressure in the liquid discharge apparatus. The pump 20 may be exemplified by a syringe pump, a tube pump, a diaphragm pump, and a gear pump.

As the liquid 9, a liquid such as a conductive liquid and a UV curable liquid may be used, and it can be to subject the liquid to deaerating processing before the liquid is used. The liquid filler 8 may be exemplified by water or the like. As the film 6, a material having a small gas permeability such as an aluminum multilayer film may be used, for example. By using a material having a small gas permeability as the film 6, it is possible to prevent permeation of bubbles between the liquid filler 8 and the liquid 9 even if bubbles are generated. The film 6 is in contact with the liquid filler 8; therefore, it is possible to reduce permeation of gas compared with the case of the liquid filler 8 in contact with gas.

If the liquid discharge apparatus of the present embodiment is used in a dispenser of an imprint apparatus, as the liquid 9, a liquid ultraviolet-curing resin in a uncured state may be used. As the liquid filler 8, a liquid such as water whose density is close to the density of the ultraviolet-curing resin used as the liquid 9 may be used. In order to maintain a discharge condition of the liquid 9 from the nozzle 32 to be constant, a liquid having a density of 90 to 110% of the density of the liquid 9 is used as the liquid filler 8, for example.

Operation of the liquid discharge apparatus will be described as below. If the liquid 9 is discharged from the nozzle 32, the liquid 9 inside the film 6 is reduced, and the flexible film 6 is deformed. As the film 6 becomes deformed, the pressure of the liquid filler 8 in the container 7 and the pipe 13 becomes decreased. Change in pressure of the liquid filler 8 in accordance with the discharge of the liquid 9 is measured by the manometer 17. Pressure data regarding the liquid filler 8 measured by the manometer 17 is transmitted to the controller 18. The controller 18 opens the valve 21, and drives the pump 20 so as to control the pressure of the liquid filler 8 in the container 7 and the pipe 13 to be within a tolerance range. If a negative pressure applied to the head 5 becomes increased, the pump 20 is driven in a manner as to supply the liquid filler 8 to the container 7. Consequently, the pressure of the liquid filler 8 becomes increased, and thus the negative pressure applied to the head 5 becomes within the tolerance range. Pressure data regarding the liquid filler 8 controlled to be within the tolerance range, which is measured by the manometer 17, is transmitted to the controller 18, and the pump 20 is stopped in response to a signal from the controller 18, and thus the valve 21 is closed. In this manner, because the pressure in the container 7 and the pipe 13 is controllable within the tolerance range, it is possible to maintain the meniscus state of the nozzle 32, and secure stability of the discharge from the nozzle 32.

Figure 2:
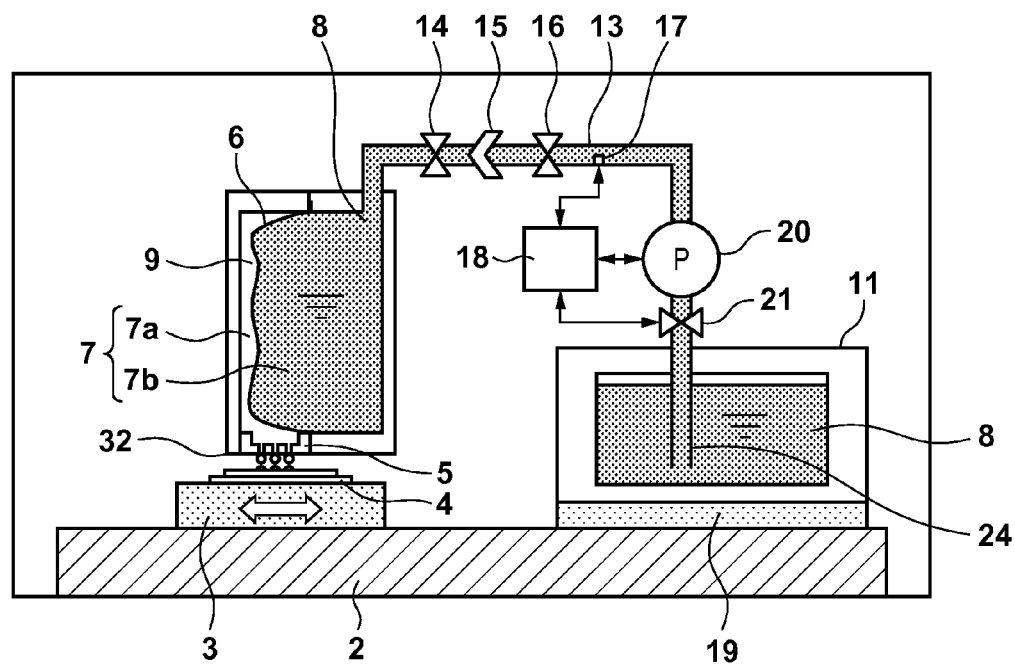
FIG. 2 is a drawing showing a state in which a film is deformed in FIG. 1.

FIG. 2 shows a state in which the film 6 is deformed due to consumption of the liquid 9. Change in weight of the liquid filler 8 in the tank 11 due to supply of the liquid filler 8 from a pipe 24 in the tank 11 into the container 7 is measured by the weight scale 19. Based on the measurement result from the weight scale 19, the controller 18 obtains an amount of the liquid 9 discharged from the nozzle 32. The controller 18 calculates the amount of the liquid 9 discharged from the nozzle 32, thereby obtaining the remaining amount of the liquid 9 in the container 7. If the remaining amount of the liquid 9 reaches a reference amount, the controller 18 displays a message or raises an alarm for prompting a user to replace the container 7, through which the user is notified of a replacement time of the container 7, thereby preventing the liquid discharge apparatus from being stopped due to shortage of the liquid 9 in the container 7. According to the present embodiment, it is possible to reduce run-down time of the liquid discharge apparatus, thus enhancing productivity of the liquid discharge apparatus. In the present embodiment, it is possible to obtain the amount of the liquid 9 discharged from the head 5 without bringing the weight scale 19 into contact with the liquid 9 in the container 7. Accordingly, it is possible to prevent fine foreign matters adhering to the weight scale 19 and a slight amount of effluents from the weight scale 19 from intruding into and polluting the liquid 9.

[Second Embodiment]

Figure 3:
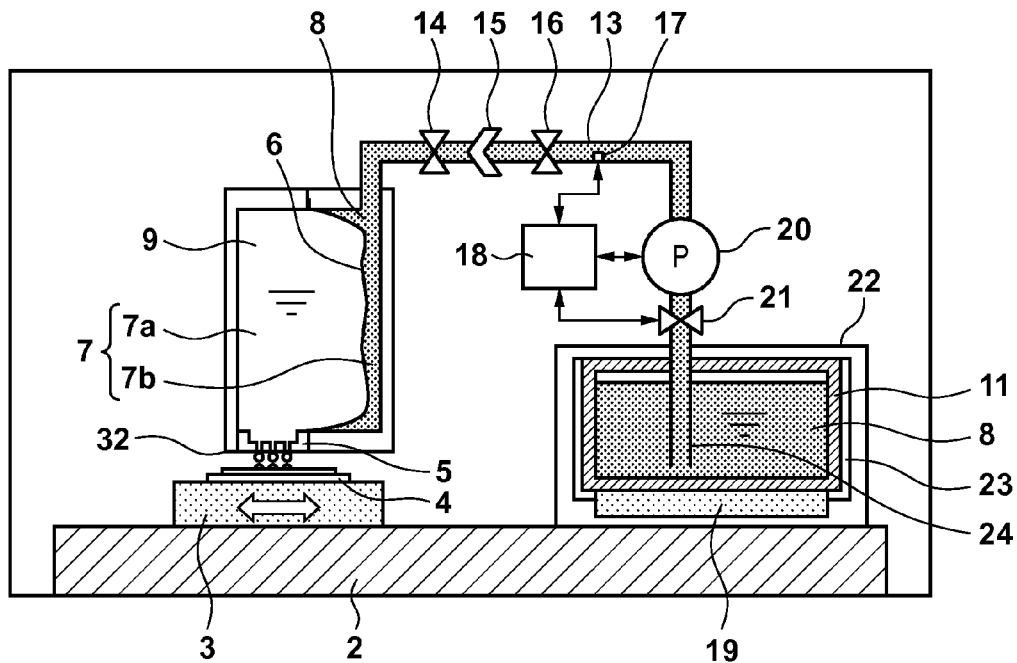
FIG. 3 is a schematic diagram of a liquid discharge apparatus according to a second embodiment.

The second embodiment of the present invention will be described with reference to FIG. 3. As shown in FIG. 3, the tank 11 of the liquid filler 8 may be provided inside a holding unit 22. The tank 11 is detachably disposed on the weight scale 19. The weight scale 19 is disposed inside the holding unit 22. Since a gap 23 is formed between the tank 11 and the holding unit 22, the weight scale 19 can measure change in weight of the tank 11. Hence, it is possible to measure change in weight of the liquid filler 8 in the tank 11 due to movement of the liquid filler 8 in the tank 11 from the pipe 24 to the container 7. By measuring change in weight of the liquid filler 8 in the tank 11, it is possible to obtain the amount of the liquid 9 discharged from the nozzle 32. The amount of the liquid 9 discharged from the nozzle 32 is calculated, the remaining amount of the liquid 9 in the container 7 is obtained, and the user is notified of the replacement time of the container 7, thereby preventing run-down of the liquid discharge apparatus due to shortage of the liquid 9 in the container 7. Because the run-down time of the liquid discharge apparatus can be reduced, it is possible to enhance productivity of the liquid discharge apparatus. The other configurations are the same as those in the first embodiment, and thus description thereof will be omitted.

[Third Embodiment]

Figure 4:
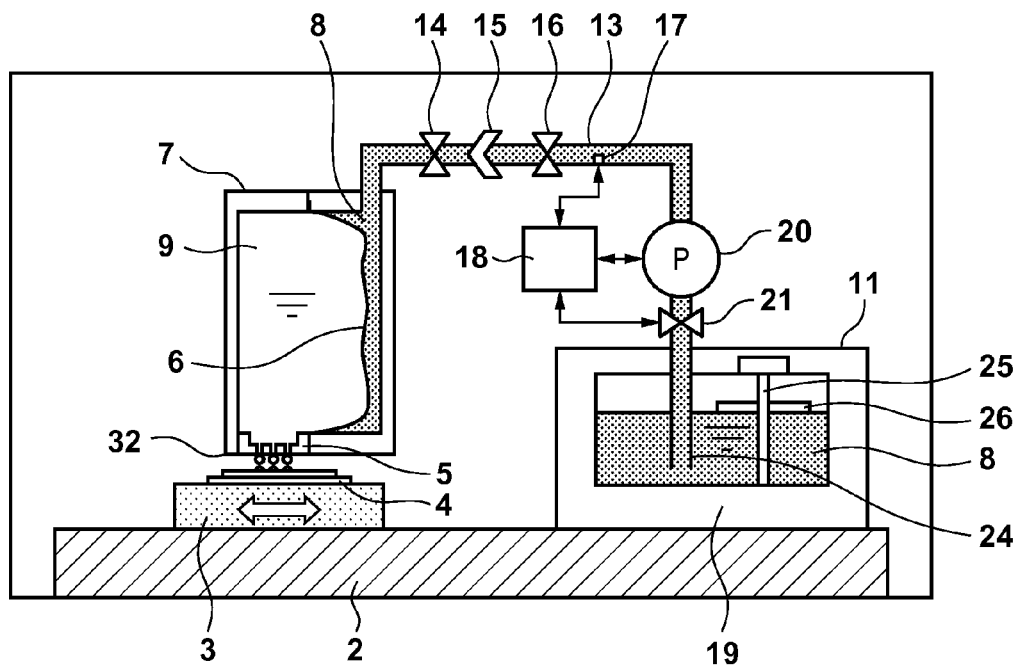
FIG. 4 is a schematic diagram of a liquid discharge apparatus according to a third embodiment.

The third embodiment of the present invention will be described with reference to FIG. 4. In the third embodiment, as shown in FIG. 4, there is provided a combination of a float 26 and a magnetic sensor 25 (measurement unit) for the purpose of measuring a position of a liquid level (fluid level) of the liquid filler 8 in the tank 11. Configuring the float 26 to float in the liquid filler 8 in the tank 11, a magnet is so provided inside the float 26 as to measure a position of the float 26 by the magnetic sensor 25. Through the measurement of the position of the liquid level of the liquid filler 8 in the tank 11 by using the magnetic sensor 25, it is possible to measure change in volume of the liquid filler 8 in the tank 11 due to the movement of the liquid filler 8 in the tank 11 to the container 7. By measuring change in volume of the liquid filler 8 in the tank 11, it is possible to calculate the amount of the liquid 9 discharged from the nozzle 32. The amount of the liquid 9 discharged from the nozzle 32 is calculated so as to grasp the remaining amount of liquid 9 in the container 7, and the user is notified of the replacement time of the container 7, thereby preventing the run-down of the liquid discharge apparatus due to shortage of the liquid 9 in the container 7. Because the run-down time of the liquid discharge apparatus can be reduced, it is possible to enhance productivity of the liquid discharge apparatus. It is also possible to calculate the amount of the liquid 9 in the container 7 without bringing the float 26 and the magnetic sensor 25 into contact with the liquid 9. Accordingly, fine foreign matters adhering to the float 26 and the magnetic sensor 25, and a slight amount of effluents from the float 26 and the magnetic sensor 25 are prevented from intruding into the liquid 9. The position of the liquid level of the liquid filler 8 in the tank 11 may be measured by other unit than the combination of the float 26 and the magnetic sensor 25. For example, a measurement unit of an optical type, a capacitance type, or an ultrasonic type may also measure the position of the liquid level of the liquid filler 8 in the tank 11. The other configurations are the same as those in the first embodiment, and thus description thereof will be omitted.

[Fourth Embodiment]

Figure 5:
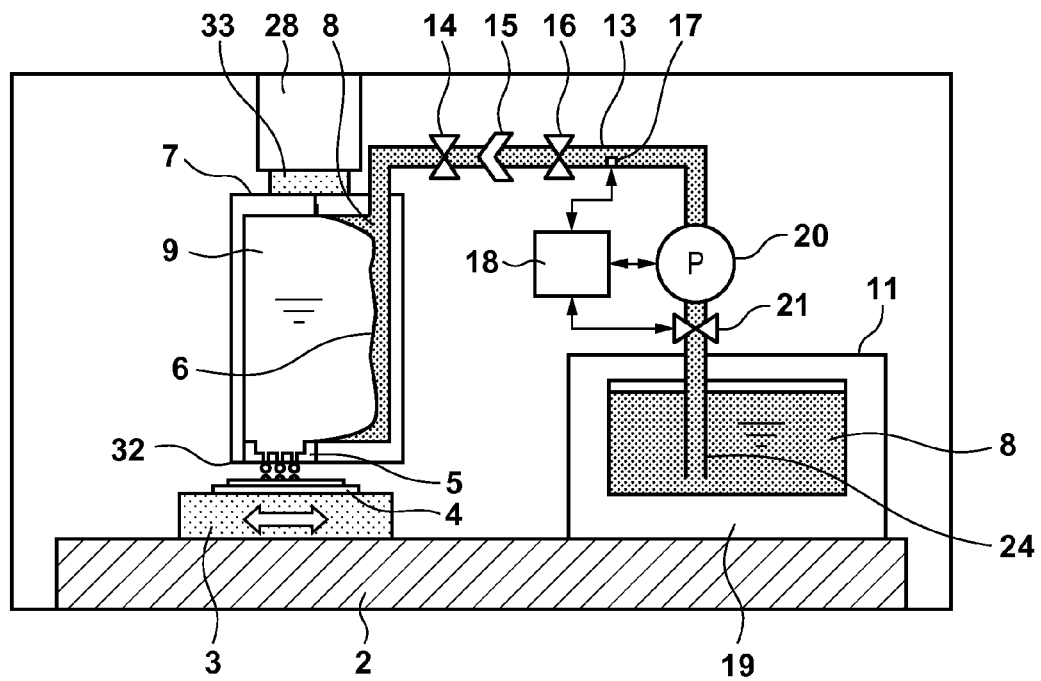
FIG. 5 is a schematic diagram of a liquid discharge apparatus according to a fourth embodiment.

The fourth embodiment of the present invention will be described with reference to FIG. 5. In the fourth embodiment, as shown in FIG. 5, the liquid discharge apparatus is provided with a holding unit 28 of a weight scale (measurement unit) 33 that measures total weight of the liquid 9 and the liquid filler 8 in the container such that the holding unit 28 retains the container 7 via the weight scale 33. In the fourth embodiment, the liquid 9 is formed of a liquid whose density is different from that of the liquid filler 8. Because the liquid 9 and the liquid filler 8 have different densities, if the liquid 9 is discharged from the nozzle 32, and the amount of the liquid filler 8 to be filled in the container 7 is changed, the total weight of the liquid 9 and the liquid filler 8 in the container 7 becomes changed. The change in total weight in the container 7 is measured by the weight scale 33, and the amount of the liquid 9 discharged from the nozzle 32 is calculated based on the change in total weight. The amount of the liquid 9 discharged from the nozzle 32 is calculated so as to grasp the remaining amount of the liquid 9 in the container 7, and the user is notified of the replacement time of the container 7, thereby preventing run-down of the apparatus body 1 due to shortage of the liquid 9 in the container 7. It is possible to reduce the run-down time of the liquid discharge apparatus, thus enhancing the productivity of the liquid discharge apparatus. The other configurations are the same as those in the first embodiment, and thus description thereof will be omitted.

[Fifth Embodiment]

Figure 6:
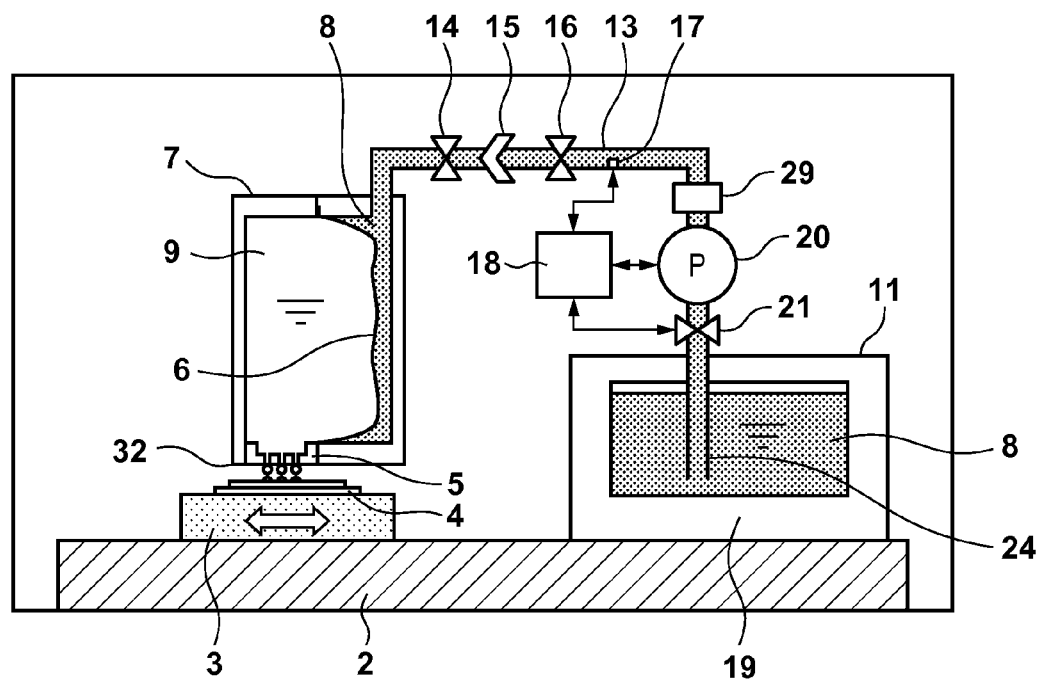
FIG. 6 is a schematic diagram of a liquid discharge apparatus according to a fifth embodiment.

The fifth embodiment of the present invention will be described with reference to FIG. 6. In the fifth embodiment, as shown in FIG. 6, the pipe 13 is provided with a flow integrator (measurement unit) 29. The flow integrator 29 is so provided as to grasp an integrated flow rate of the liquid filler 8 flowing through the pipe 13. It is possible to calculate the amount of the liquid 9 discharged from the nozzle 32 based on the integrated flow rate of the liquid filler 8 flowing through the pipe 13. The amount of the liquid 9 discharged from the nozzle 32 is calculated so as to grasp the remaining amount of the liquid 9 in the container 7, and the user is notified of the replacement time of the container 7, thereby preventing the run-down of the apparatus body 1 due to shortage of the liquid 9 in the container 7. It is possible to reduce the run-down time of the liquid discharge apparatus, thus enhancing the productivity of the liquid discharge apparatus. The other configurations are the same as those in the first embodiment, and thus description thereof will be omitted.

[Sixth Embodiment]

Figure 7:
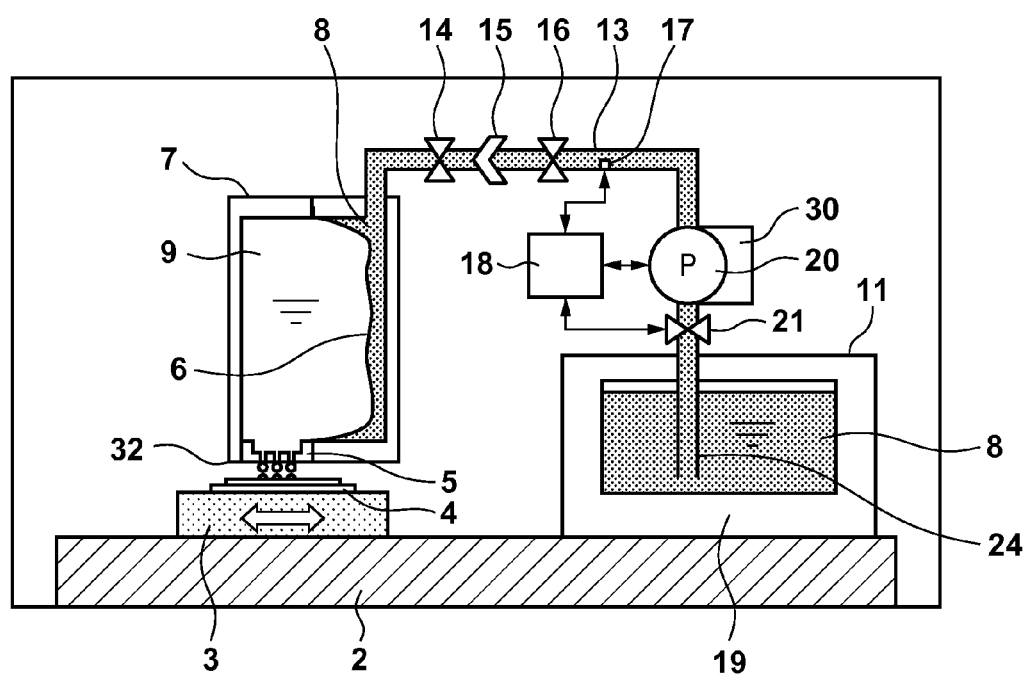
FIG. 7 is a schematic diagram of a liquid discharge apparatus according to a sixth embodiment.

The sixth embodiment of the present invention will be described with reference to FIG. 7. As shown in FIG. 7, the pump 20 may be provided with a measurement unit 30 that measures amount of the liquid filler 8 discharged by the pump 20. The measurement unit 30 is so provided as to grasp amount of delivered liquid of the liquid filler 8 flowing through the pipe 13. It is possible to calculate the amount of the liquid 9 discharged from the nozzle 32 based on the amount of delivered liquid of the liquid filler 8 flowing through the pipe 13. The amount of the liquid 9 discharged from the nozzle 32 is calculated so as to grasp the remaining amount of the liquid 9 in the container 7, and the user is notified of the replacement time of the container 7, thereby preventing the run-down of the apparatus body 1 due to shortage of the liquid 9 in the container 7. It is possible to reduce the run-down time of the liquid discharge apparatus, thus enhancing the productivity of the liquid discharge apparatus. The other configurations are the same as those in the first embodiment, and thus description thereof will be omitted.

[Article Manufacturing Method]

An article manufacturing method according to the embodiments of the present invention is suitable for manufacturing articles such as micro devices like semiconductor devices, and elements having microstructures, for example. The manufacturing method includes a step of forming a pattern on a substrate by bringing a mold into contact with resin on the substrate using an imprint apparatus. The manufacturing method may include another well-known step of processing the substrate on which the pattern is formed (oxidization, deposition, vaporization, doping, planarization, etching, resist stripping, dicing, bonding, packaging, etc.). The article manufacturing method according to the embodiments is advantageous in at least one of performance, quality, productivity, and production cost of the articles compared with conventional methods.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-143659, filed Jul. 11, 2014, which is hereby incorporated by reference herein in its entirety.

What is claimed is:

1. A liquid discharge apparatus comprising:
   a container divided into a first chamber and a second chamber by a dividing member, said first chamber including a discharge outlet that discharges a liquid onto an object placed on a base plate and configured to contain the liquid, said second chamber configured to contain a liquid filler;
   a tank configured to store the liquid filler;
   a connecting portion that provides liquid filler communication between said tank and said second chamber;

a measurement unit configured to measure an amount of the liquid filler supplied from said tank to said second chamber; and a controller configured to determine an amount of the liquid contained in said first chamber based on a measurement result from said measurement unit.

2. The apparatus according to claim 1,
wherein the dividing member is a flexible film.

3. The apparatus according to claim 1,
wherein said measurement unit is configured to measure the amount of the liquid filler supplied to said second chamber by measuring change in weight of the liquid filler in said tank.

4. The apparatus according to claim 1,
wherein said measurement unit is configured to measure the amount of the liquid filler supplied to said second chamber by measuring change in position of a liquid filler level of the liquid filler in said tank.

5. The apparatus according to claim 1,
wherein the liquid filler is a liquid whose density is different from a density of the liquid, and
said measurement unit is configured to measure the amount of the liquid filler supplied to said second chamber by measuring change in total weight of the liquid and the liquid filler in said container.

6. The apparatus according to claim 1,
wherein said measurement unit is configured to measure the amount of the liquid filler supplied to said second chamber by measuring an integrated flow rate of the liquid filler flowing through said connecting portion.

7. The apparatus according to claim 6,
wherein said measurement unit includes a flow integrator arranged in said connecting portion.

8. The apparatus according to claim 6, further comprising a pump arranged in said connecting portion and configured to feed out the liquid filler toward said second chamber,
wherein said measurement unit measures the integrated flow rate of the liquid filler fed out by said pump.

9. The apparatus according to claim 1, further comprising:
a pump arranged in said connecting portion and configured to feed out the liquid filler toward said second chamber; and
a manometer configured to measure pressure of the liquid filler flowing through said connecting portion,
wherein said controller controls said pump such that pressure of the liquid filler flowing through said connecting portion becomes within a tolerance range.

10. The apparatus according to claim 1,
wherein said controller displays a message, or raises an alarm for prompting replacement of said container if the obtained amount of the liquid reaches a reference value.

11. The apparatus according to claim 1,
wherein said first chamber and said second chamber are arranged so as to be adjacent to each other in a horizontal direction.

12. The apparatus according to claim 1,
wherein, said first chamber and said second chamber are arranged so as to be adjacent to each other in a vertical direction.

13. The apparatus according to claim 1,
wherein the measurement unit comprises a weight scale on which the tank is mounted and configured to measure weight of the tank containing the liquid filler,
the apparatus further comprising a housing for accommodating the weight scale with the tank mounted thereon,
wherein the housing is mounted on the base plate, and a clearance for enabling the weight scale to measure the weight of the tank is provided between the tank mounted on the weight scale and an inner wall of the housing.

14. An imprint apparatus for forming a pattern on a substrate by bringing a mold into contact with resin on the substrate, said imprint apparatus comprising:
a liquid discharge apparatus configured to discharge the resin as a liquid on the substrate,
said liquid discharge apparatus including:
a container divided into a first chamber and a second chamber by a dividing member, said first chamber including a discharge outlet that discharges the liquid and configured to contain the liquid, and said second chamber configured to contain a liquid filler;
a tank configured to store the liquid filler;
a connecting portion that provides liquid filler communication between said tank and said second chamber;
a measurement unit configured to measure an amount of the liquid filler supplied from said tank to said second chamber; and
a controller configured to determine an amount of the liquid contained in said first chamber based on a measurement result from said measurement unit.

15. The imprint apparatus according to claim 14,
wherein the liquid filler comprises water.

16. A method of manufacturing an article, the method comprising:
forming a pattern on a substrate by bringing a mold into contact with resin on the substrate using an imprint apparatus; and
processing the substrate on which the pattern is formed, to manufacture the article,
said imprint apparatus including a liquid discharge apparatus configured to discharge the resin as a liquid on the substrate,
said liquid discharge apparatus including:
a container divided into a first chamber and a second chamber by a dividing member, said first chamber including a discharge outlet that discharges the liquid onto an object placed on a base plate and configured to contain the liquid, and said second chamber configured to contain a liquid filler;
a tank configured to store the liquid filler;
a connecting portion that provides liquid filler communication between said tank and said second chamber;
a measurement unit configured to measure an amount of the liquid filler supplied from said tank to said second chamber; and
a controller configured to determine an amount of the liquid contained in said first chamber based on a measurement result from said measurement unit.

* * * * *